US010554773B2

(12) United States Patent
Maze et al.

(10) Patent No.: US 10,554,773 B2
(45) Date of Patent: Feb. 4, 2020

(54) ADAPTIVE PERSISTENT PUSH

(71) Applicant: CANON KABUSHIKI KAISHA, Tokyo (JP)

(72) Inventors: Frédéric Maze, Langan (FR); Romain Bellessort, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 15/317,917

(22) PCT Filed: Jun. 8, 2015

(86) PCT No.: PCT/EP2015/062746
§ 371 (c)(1),
(2) Date: Dec. 9, 2016

(87) PCT Pub. No.: WO2015/189159
PCT Pub. Date: Dec. 17, 2015

(65) Prior Publication Data
US 2017/0111463 A1  Apr. 20, 2017

(30) Foreign Application Priority Data

Jun. 12, 2014 (GB) .................................. 1410539.9
Oct. 16, 2014 (GB) .................................. 1418374.3

(51) Int. Cl.
*H04L 29/08* (2006.01)
*H04L 29/06* (2006.01)

(52) U.S. Cl.
CPC .......... *H04L 67/26* (2013.01); *H04L 67/1002* (2013.01); *H04L 67/42* (2013.01)

(58) Field of Classification Search
CPC ......... H04L 67/02; H04L 67/10; H04L 67/26; H04L 67/42
USPC ........................................................ 709/203
See application file for complete search history.

(56) References Cited

U.S. PATENT DOCUMENTS

| 2011/0173681 A1 | 7/2011 | Qureshi et al. |
| 2012/0173610 A1 | 7/2012 | Bleau et al. |
| 2015/0271233 A1* | 9/2015 | Bouazizi ................ H04L 65/60 709/219 |

OTHER PUBLICATIONS

Web Runtime API (WRAPI)—Push, Draft Version 1.0, Open Mobile Alliance, OMA-TS-WRAPI_Push-V1_0-20120917-D, No. 1.0, Sep. 17, 2012, pp. 1-34, Figure 1, URL: ftp/public_documents/CD/Permanent_documents/.

Wei, et al., "Low Latency Live Video Streaming over HTTP 2.0", Adobe Research, Adobe Systems Inc. 345 Park Ave, San Jose, CA 95110, USA, NOSSDAV'14, Mar. 19-21, 2014, Singapore.

(Continued)

*Primary Examiner* — Glenford J Madamba
(74) *Attorney, Agent, or Firm* — Canon U.S.A., Inc. IP Division

(57) ABSTRACT

A method for providing resources to a client, the method being implemented at a server and comprising: making available an indication to the client, indicating that the server is configured to activate a persistent push feature upon authorization of said client, said persistent push feature allowing the server to push resources to the client at any time; and receiving a first message from the client, said first message being based on said indication and allowing the server to continuously push resources to the client.

23 Claims, 9 Drawing Sheets

(56) References Cited

OTHER PUBLICATIONS

Bouazizi, "Dash over HTTP/2 and WebSocket", Samsung Electronics Co., Ltd., International Organization for Standardisation, Organization Internationale De Normalisation, ISO/IEC JTC1/SC29/WG11, Coding of Moving Pictures and Audio, ISO/IEC JTC1/SC29/WG11 MPEG2014/m33xxx, Jul. 2014, Sapporo, Japan.

Information technology, "Dynamic adaptive streaming over HTTP (DASH)—Part 1: Media presentation description and segment formats", ISO/IEC JTC 1/SC 29, Date: Aug. 2, 2013, ISO/IEC FDIS 23009-1:2013(E), ISO/IEC JTC 1/SC29/WG11.

* cited by examiner

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  type="static"
  mediaPresentationDuration="PT3256S"
  minBufferTime="PT1.2S"
  profiles="urn:mpeg:dash:profile:isoff-on-demand:2011">

<BaseURL>http://cdn1.example.com/</BaseURL>
  <BaseURL>http://cdn2.example.com/</BaseURL>
  <PushURL>http://cdn2.example.com/push/2564597502</PushURL>

<Period>
    <!-- Video -->
    <AdaptationSet mimeType="video/mp4" codecs="avc1.4d0228"
subsegmentAlignment="true" subsegmentStartsWithSAP="2">
      <Representation id="1" bandwidth="256000" width="320" height="240">
        <BaseURL>8563456473.mp4</BaseURL>
      </Representation>
      <Representation id="2" bandwidth="512000" width="640" height="480">
        <BaseURL>56363634.mp4</BaseURL>
      </Representation>   </AdaptationSet>
    <!-- French Audio -->
    <AdaptationSet mimeType="audio/mp4" codecs="mp4a.40.2" lang="fr"
subsegmentAlignment="true" subsegmentStartsWithSAP="1">
      <Representation id="3" bandwidth="64000">
        <BaseURL>3463275477.mp4</BaseURL>
      </Representation>
      <Representation id="4" bandwidth="32000">
        <BaseURL>5685763463.mp4</BaseURL>
      </Representation>
    </AdaptationSet>
  </Period>
</MPD>
```

Fig. 6

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  type="static"
  mediaPresentationDuration="PT3256S"
  minBufferTime="PT1.2S"
  profiles="urn:mpeg:dash:profile:isoff-on-demand:2011">

<BaseURL>http://cdn1.example.com/</BaseURL>
  <BaseURL>http://cdn2.example.com/</BaseURL>

<Period>
    <!-- Video -->
    <AdaptationSet mimeType="video/mp4" codecs="avc1.4d0228"
subsegmentAlignment="true" subsegmentStartsWithSAP="2">
      <PushURL>push/2564597502</PushURL>
      <Representation id="1" bandwidth="256000" width="320" height="240">
        <BaseURL>8563456473.mp4</BaseURL>
      </Representation>
      <Representation id="2" bandwidth="512000" width="640" height="480">
        <BaseURL>56363634.mp4</BaseURL>
      </Representation>    </AdaptationSet>
    <!-- French Audio -->
    <AdaptationSet mimeType="audio/mp4" codecs="mp4a.40.2" lang="fr"
subsegmentAlignment="true" subsegmentStartsWithSAP="1">
      <PushURL>push/2564598099</PushURL>
      <Representation id="3" bandwidth="64000">
        <BaseURL>3463275477.mp4</BaseURL>
      </Representation>
      <Representation id="4" bandwidth="32000">
        <BaseURL>5685763463.mp4</BaseURL>
      </Representation>
    </AdaptationSet>
  </Period>
</MPD>
```

Fig. 7

ADAPTIVE PERSISTENT PUSH

CROSS REFERENCE TO RELATED APPLICATIONS

This application is a national phase application of PCT application no. PCT/EP2015/062746 filed on Jun. 8, 2015 and which claims the benefit under 35 U.S.C. § 119(a)-(d) of United Kingdom Patent Application No. 1410539.9 filed on Jun. 12, 2014 and entitled "Adaptative persistent push" and of United Kingdom Patent Application No. 1418374.3 filed on Oct. 16, 2014 and entitled "Improved adaptative persistent push." The above cited patent applications are incorporated herein by reference in their entirety.

FIELD OF THE INVENTION

The present invention relates in general to the pushing of data, and in particular to methods for providing and obtaining resources from a server to a client, corresponding devices and system.

BACKGROUND OF THE INVENTION

The so-called HTTP protocol allows a client and a server to communicate by exchanging requests and responses. Requests are usually sent by the client, while responses are returned by the server. HTTP Requests and Responses are transmitted on a TCP connection between the client and the server. Several versions of the HTTP protocol exist.

Early versions of HTTP, including HTTP/1.0 and HTTP/1.1 (or HTTP/1.x), require a TCP connection for each pair of request-response.

More recent versions allow reusing a TCP connection to exchange several pairs of request-response. In the most recent version (HTTP/2 or its predecessor SPDY), a single TCP connection is used between a client and a server such that all the requests and responses are exchanged through this single connection.

Moreover, the version HTTP/2 manages a full multiplexing of requests and responses so that the client can send parts of several requests in any order and correspondingly, the server can respond to the requests in any order, and also can send parts of different responses in any order. Thus, there is no need to establish a new TCP connection for each new request and corresponding response.

In practice, this multiplexing is implemented by means of streams. A stream is a bidirectional channel between a client and a server for exchanging a pair of request-response. A stream is characterized by an identifier ID, which is generally an integer value. The client and the server exchange HTTP/2 frames (e.g. DATA frames or HEADERS frames) for managing streams and for transmitting data and resources over them. Each time a new request is sent by a client, a new stream is created. Such a request may be sent through one or more HTTP/2 frames, each of them comprising the corresponding stream ID. As a result, even though a single TCP connection is established, several HTTP/2 streams can be opened concurrently. Generally, a stream is closed once the response associated with a given request has been received by the client that originated said request.

Web resources such as web pages or streaming contents generally contain links to other data or resources, which themselves may contain links to other resources. To fully load a web resource requested by a client, all the linked and sub-linked resources generally need to be retrieved by the client. This incremental discovery may lead to a slow loading of the web resource, especially on high latency networks such as mobile networks.

For that reason, server push features (HTTP/2 Push) that allow sending unsolicited resources to clients are implemented in servers. Thus, when receiving a request for a given web resource, the server sends the requested resource and under certain circumstances, pushes linked resources.

In practice, in order to push a resource to a client, a server must first indicate which resource the server intends to push, for instance using PUSH_PROMISE frames. Next, the server can create a new stream in order to transmit said resource. One may note that client has the possibility of rejecting the pushed resources, for instance when the corresponding resources are already available in cache, typically by closing the server-initiated stream used to transmit said pushed resource. Contrary to pushed resources themselves, the above-mentioned frames such as PUSH_PROMISE frames, can only be sent on streams that have been initiated by clients.

In the exemplary case of a live broadcast (streaming) of a video resource (Dynamic Adaptive Streaming over HTTP or DASH) requested by a client, such push features may allow reducing the latency since the server can push a new video segment as soon as it obtains said segment, and also reducing the traffic from client to server by decreasing as much as possible the need for client to request each segments.

In this context, the usage of HTTP-based protocols to enable the pushing of resources by a DASH server has been discussed.

Solutions based on specific usages of HTTP/1.0 and HTTP/1.1, are known but they are generally discarded due to their limitations in the context of DASH. Indeed, according to these protocols, partial responses sent by a server to request from clients may be buffered by intermediaries between the server and the client, thus having an impact on the live broadcasting.

In order to avoid such drawbacks of HTTP-based solution, it has been proposed to use the so-called WebSocket protocol. Indeed, this protocol allows establishing a bidirectional channel between a client and a server. Consequently, once such a connection is available between a client and a server, the server can push any resource to client even in the absence of requests for said resources from client. In addition, the WebSocket channel can also be used by client, for instance to require a different quality for the pushed resources.

However, being based on WebSocket, this solution may not work properly with HTTP caching. For instance, a resource pushed to a client running in a Web Browser may not be available in said Web Browser cache.

Also, in case of several intermediaries like proxies are present between the server and the client, said intermediaries are generally configured to cache HTTP data, but not to cache WebSocket data. This is a significant issue with regard to the usage of WebSocket as cache memories are critical to ensure a good quality of service for the end clients.

Pipelines for sending HTTP responses to video displays are power-hungry and have been extensively optimized by platforms such as iOS. Migrating to WebSocket would probably be less optimized compared to these solutions, in terms of battery life and processing cost.

Another advantage of HTTP over WebSocket is that the client may help the server to order pushed data responsive to the client's needs, typically by using a HTTP/2 mechanism called priorities. WebSocket does not handle such possibility, which may be useful for instance when the client's buffer is almost empty, and the server may thus send subtitles before video data.

In addition, a client running in a Web Browser and that relies on WebSocket to obtain some resources has to process said resources at JavaScript level, which may not be efficient. As a matter of fact, JavaScript is appropriate for handling small amounts of resources, but not so appropriate for handling large amounts of resources such as, for instance, video segments.

Other solutions, as described in the document "Low Latency Live Video Streaming over HTTP 2.0" written by Sheng Wei and Viswanathan Swaminathan (Adobe), are proposed that allow the client to request bigger amounts of resources, for instance a number K of video segments. While this solution provides good results regarding latency and reduction of the number of requests, the resources sent to the client are fully dependent on the client requests. Indeed, after sending the requested K segments, the server cannot sends another segment without a request from the client. In addition, these solutions rely on non-standard versions of SPDY or HTTP/2.

Consequently, there is a need for a method enabling a client to allow a server to push any resources at any time (i.e. to perform continuous push or indefinite-end push) while being also compatible with HTTP/2, SPDY, and clients using HTTP/2 libraries through HTTP/1.x APIs.

SUMMARY OF THE INVENTION

The present invention has been devised to address one or more of the foregoing concerns.

In this context, there is provided a method for providing resources to a client, the method being implemented at a server and comprising:

making available an indication to the client, indicating that the server is configured to activate a persistent push feature upon authorization of said client, said persistent push feature allowing the server to push resources to the client at any time according to a persistent push policy; and receiving a first message from the client, said first message being based on said indication and allowing the server to continuously push resources to the client.

Correspondingly, the invention concerns a method for obtaining resources from a server, the method being implemented at a client and comprising:

generating a first message based on an indication that the server is configured to activate a persistent push feature upon authorization of said client, said persistent push feature allowing the server to push resources to the client at any time, according to a persistent push policy; and sending said first message to the server, thereby allowing the server to continuously push resources to the client.

Thus, the present invention makes it possible to perform persistent push in a way fully compatible with HTTP infrastructure, in particular with caching features of network intermediaries and web browsers.

This is due to the fact that the server indicates to the client how to activate persistent push so that the server can push resources to the client at any time.

Consequently, the latency is reduced, thanks to persistent push of resources by the server, which limits the number of requests, and live broadcast may be performed using standard HTTP means in a more efficient way (reduced latency, reduced number of requests).

The invention also concerns a server for providing media data to a client, the server being configured to implement a method as above-mentioned.

The invention also concerns a client for obtaining media data from a server, the client being configured to implement a method as above-mentioned.

The invention also concerns a system for exchanging media data between a server and at least one client, as above-mentioned.

Optional features of the invention are further defined in the dependent appended claims.

BRIEF DESCRIPTION OF THE DRAWINGS

Embodiments of the invention will now be described, by way of example only, and with reference to the following drawings in which:

FIGS. 6 and 7 represent exemplary MPD files in which the server has included an indication according to embodiments.

DETAILED DESCRIPTION OF EMBODIMENTS OF THE INVENTION

Figure 1:
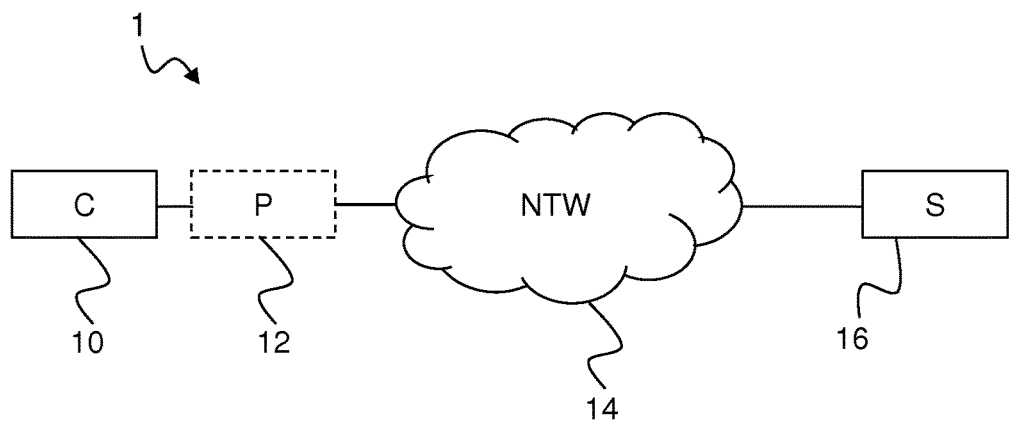
FIG. 1 illustrates a typical web client-server system in which embodiments may be implemented.

The invention provides methods, systems and devices for exchanging, providing, obtaining and transmitting resources from a server to a client.

The word "resources" refers to data in general, for instance media data.

The word "persistent push" refers to push that may be performed at any time while the persistent push is activated/allowed. The push is typically a HTTP/2 feature.

The word "policy" or "push policy" refers to the rules or guidelines to be applied when pushing data or resources.

One of the main aspects of the present invention consists in enabling a client to indicate, for instance using an HTTP/2 frame (first message), that it allows a server to persistently push resources, i.e. that server is allowed to push resources to said client at any time. Thus, the client must know how to allow persistent push, and since it depends on the implementation of push features in the server, the latter is in charge of letting know to the client how to proceed. As is described in detail below, it can be made by means of an indication of the server configuration (implementation), showing that the server is able to perform persistent push, upon authorization of the client. Such indication may be implicit when establishing a communication with the client (for instance if the push implementation is a part of an implemented protocol, so the indication is known by client during the establishment of the connection), or in a variant it may be sent by the server in a message or included in a resource requested by the client (for instance in a media description file, or a web page).

Next, once the client has indicated that it allows a server to persistently push resources, the server may keep the client-initiated stream used by the client to authorize persistent push open so that it can be used to send PUSH_PROMISE frames at any time. This is made possible thanks to a specific flag inserted at the end of any messages or frames from the server, or thanks to a specific URL defined in advance by the server as an indication of persistent push.

In addition, client and server may also exchange control messages through the client-initiated open stream, especially regarding the persistent push policy. In other words, these messages may have an impact on the resources pushed by the server to the client. The persistent push is thus adaptive since it is possible to modify the persistent push policy without having to close the client-initiated stream used for sending PUSH_PROMISE frames. In case the stream cannot handle control messages (for instance in the case where HTTP/2 library is only accessible to the client through an HTTP/1.x API), they may be exchanged through other means, as is described in detail in the following description.

By way of a non-limiting example, let's consider a client implementing a HTTP/2 library and DASH and requesting a media presentation description file (MPD) of a media data, for instance a video, to an HTTP server supporting HTTP/2 and DASH protocols. The server retrieves the MPD file and adds an indication in it, for instance a specific URL, that may be used by the client to indicate that persistent push is allowed (i.e. server is allowed to push any resource at any time to said client). The MPD file thus modified is then sent to the client in response to the request.

In a variant, the indication may be already inserted in the MPD file so that the server just sends it to the client in response to the request.

The client may then send a request to the specific URL indicated in the MPD file, thereby enabling the server to persistently push resources. This authorization allows the server to keep open the client-initiated stream used for sending the authorization, so that PUSH_PROMISE frames (announcing which resources the server intends to push) and possibly control messages can be sent to client through it. The client may determine that the video segments pushed by server should have a higher resolution. In this case, client may send a corresponding message, typically through the stream kept open, to the server so that server can adapt its persistent push policy accordingly (i.e. send higher resolutions segments). Upon reaching the end of the video, the server may send a message to the client announcing the end of the video. This message is typically sent through the stream which is kept open.

The example of video streaming over HTTP here described is provided only for illustrative purpose. Thus, the present invention is not limited thereon. Other examples are described in the following description. For instance, embodiments of the present invention may be implemented with web applications that may require a large number of resources, for instance a web gallery or a web photo album. Indeed, by enabling persistent push, such an application may allow the server to push next pictures of the album in advance, which makes the visit of the gallery or album smoother and user-friendly.

FIG. 1 shows a typical web client-server communication system 1 in which embodiments of the invention may be implemented.

It comprises a communication network NTW 14 such as an IP-based local or wide area network (LAN, WAN), a client device C 10, and a server device S 16 that offers IP-based services such as web sites or media streaming, and into which push features are implemented.

In the typical system 1, the client 10 implements a web browser through which a user interacts to generate and send HTTP requests to the server device S in order to request web resources, hereafter referred to as requested data, e.g. web pages, media file descriptions or MPD (for Media Presentation Description).

In some embodiments, an intermediary node 12 such as a proxy P located between the client and the server is provided to handle the requests and responses between the client 10 and the server 16. Push features may also be implemented in the intermediary node.

According to embodiments, the intermediary has also push capabilities, so that when it receives a pushed resource in response to a client request, it is configured to push it to the next node, until the client is reached.

Figure 2:
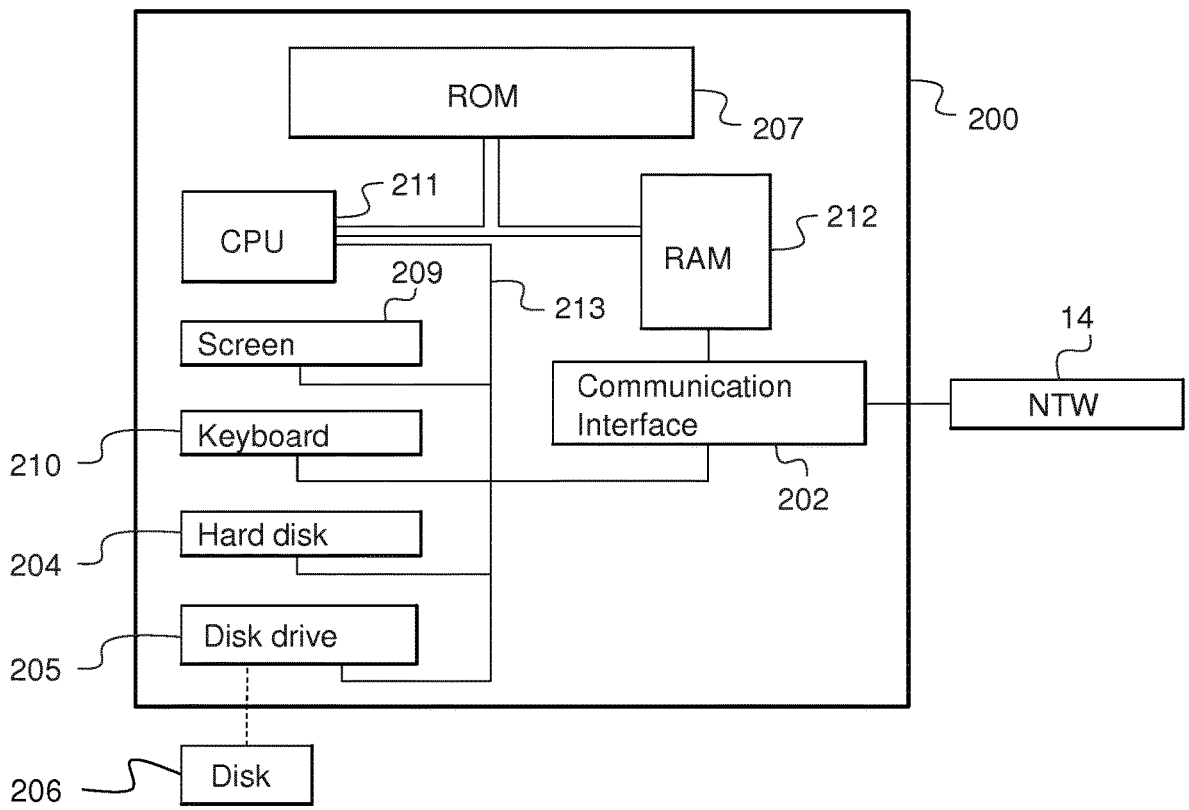
FIG. 2 is a block diagram illustrating an example of architecture for the components of a device in which embodiments may be implemented.

FIG. 2 illustrates an example of architecture for a communication device 200, for example the server 16, the client 10 or the intermediary node 12 of FIG. 1, configured to implement at least one embodiment of the present invention.

The communication device 200 may be a device such as a micro-computer, a workstation or a light portable device. The communication device 200 comprises a communication bus 213 to which there are preferably connected:

- a central processing unit 211, such as a microprocessor, denoted CPU;
- a read only memory 207, denoted ROM, for storing computer programs for implementing the invention;
- a random access memory 212, denoted RAM, for storing the executable code of methods according to embodiments of the invention as well as the registers adapted to record variables and parameters necessary for implementing methods according to embodiments of the invention;
- a communication interface 202 connected to the communication network 14 over which a client-server based communication can be implemented. The communication interface is provided to send requests or responses, such as HTTP requests/responses including web data, possibly in the Push or Pull model of communication, as well as to receive the requests or responses; and
- a data storage means 204 such as a hard disk, for storing computer programs for implementing methods of one or more embodiments of the invention and for storing data that are requested by a client, during the implementation of one or more embodiments of the invention, and for implementing a cache memory.

Cache memory is a very important feature of HTTP, since it allows a client to reduce the latency when displaying media data that are already in cache.

Typically, when considering a website, some media data are common to all the webpages of the website (e.g. background, banner). Also, some commands (e.g. rewind of streaming videos) for live events may require the resource to be stored in a cache memory.

Optionally, the communication device 200 may also include a screen 209 for displaying data such as a web page or a streaming video in the case of the client 10 and/or serving as a graphical interface with a user, by means of a keyboard 210 or any other pointing means.

The communication bus provides communication and interoperability between the various elements included in the communication device 200 or connected to it. The representation of the bus is not limiting and in particular the central processing unit is operable to communicate instructions to any element of the communication device 200 directly or by means of another element of the communication device 200.

The disk 206 can be replaced by any information medium such as for example a compact disk (CD-ROM), rewritable or not, a ZIP disk or a memory card and, in general terms, by an information storage means that can be read by a microcomputer or by a microprocessor, integrated or not into the communication device, possibly removable, and adapted to store one or more programs whose execution enables a method according to the invention to be implemented.

The executable code may be stored either in read only memory 207, on the hard disk 204 or on a removable digital medium such as for example a disk 206 as described previously. According to a variant, the executable code of the programs can be received by means of the communication network 14, via the interface 202, in order to be stored in one of the storage means of the communication device 200, such as the hard disk 204, before being executed.

The central processing unit 211 is adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

The resources or data owned by the server 16 may be stored for example in the ROM, in the hard disk 204 or in the disk 206. As explained below, some of these data may have to be downloaded together to be fully understood. Consequently, a tree representation of the data is generally stored in the server 16.

Finally, the communication device 200 comprises modules for performing the steps of the methods according to the invention, as described below with reference to FIGS. 3 to 6.

Figure 3:
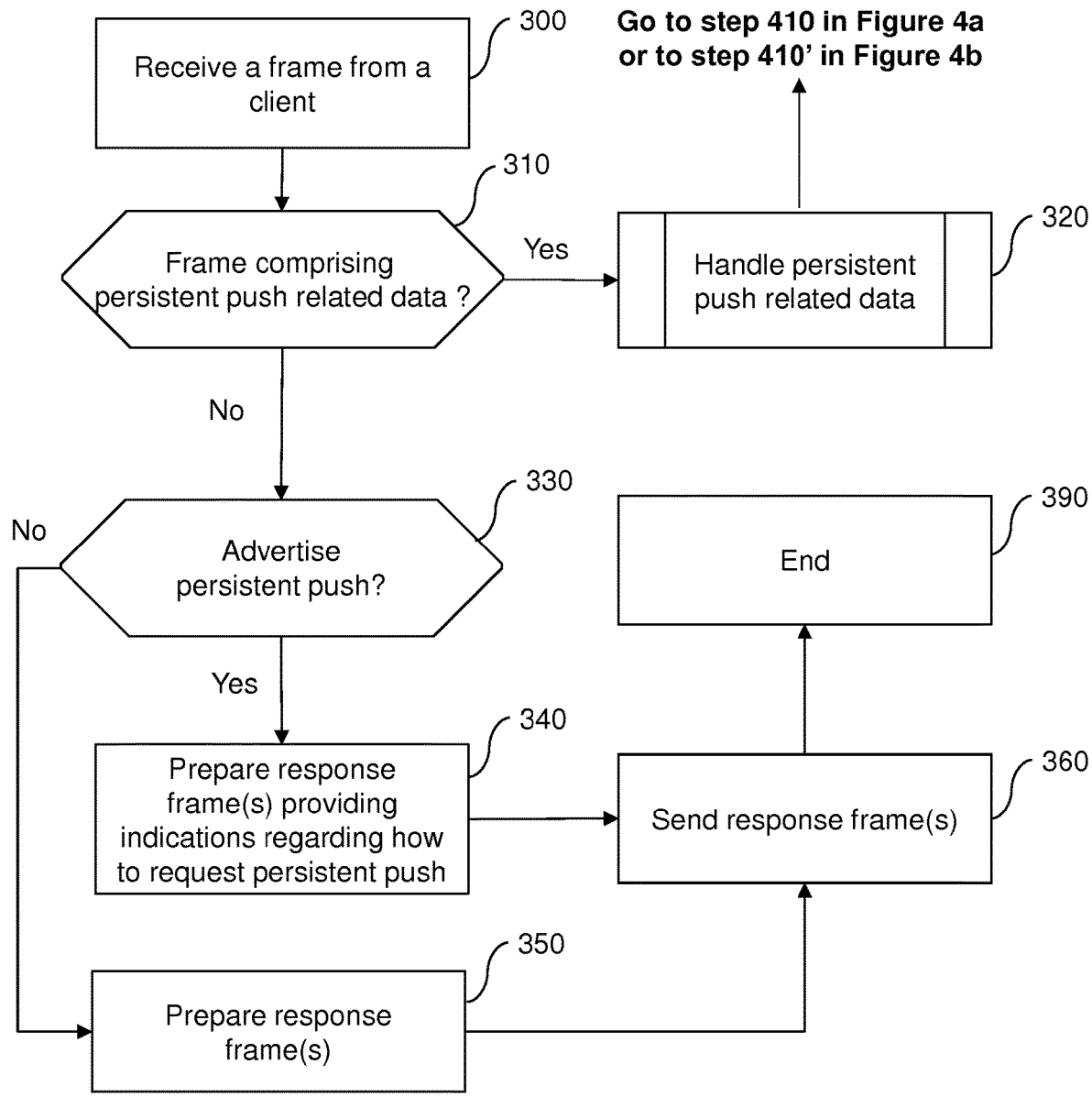
FIG. 3 is a flowchart illustrating steps of a method for providing resources from a server to a client, according to embodiments.

FIG. 3 shows general steps of a method for providing data (response frames) from a server 16 upon request from a client 10 as described below with reference to FIG. 1 or 2, according to embodiments. These steps are implemented at the server 16.

In this example, an HTTP/2 frame from the client 10 is received at step 300 by the server 16.

At step 310, the server 16 processes the received frame in order to determine whether it comprises data related to persistent push, i.e. data related to the pushing of a resource at any time by a server.

These data may be for allowing the server 16 to perform persistent push, or for stopping persistent push so that the server 16 is no longer allowed to perform persistent push. Otherwise, the persistent push related data may be for adapting the push policy (e.g. change the kind or the quality of pushed data). The effects of such data are described hereafter with reference to FIG. 4a or to FIG. 4b.

Depending on the implementation of push features in the server 16, the server 16 may look for different kinds of persistent push related data in the received frame.

For instance, the persistent push related data may comprise an URL defined in advance by the server 16 so that when the client requests such URL to the server, it means that the server is allowed to perform persistent push. In practice, such URL may appear in a ":path" header of the HTTP frame.

The persistent push related data may comprise a specific header (e.g. "allow-push" header). For instance, the specific header added in the frame by the client may have a value of "persistent" in order to indicate that persistent push is allowed. Alternatively, the header could be a yes/no value (or 1/0) depending on whether the pushing is allowed or not. In this case, said specific HTTP header is either a well-known standardized header to be used by clients and servers relying on persistent push, or a specific non-standardized header defined by a given server for the clients that interact with it.

Alternatively, the persistent push related data may comprise a SETTING_ENABLE_PERSISTENT_PUSH flag in the received frame indicating that the client allows server to persistently push data. This flag is similar to the SETTING_ENABLE_PUSH flag already known from HTTP/2 protocol for allowing "classic" push (i.e. not persistent).

Other kinds of persistent push related data may be found in the received frame, depending on the communication protocol and push features implemented by the server. For instance, the persistent push may be a feature of the communication protocol between the server 16 and the client 10, for instance negotiated during the establishment of the connection, and thus, the server 16 knows how to detect persistent push related data (e.g. a flag in the frame or a specific header) for activating this specific feature of the protocol.

Figure 4A:
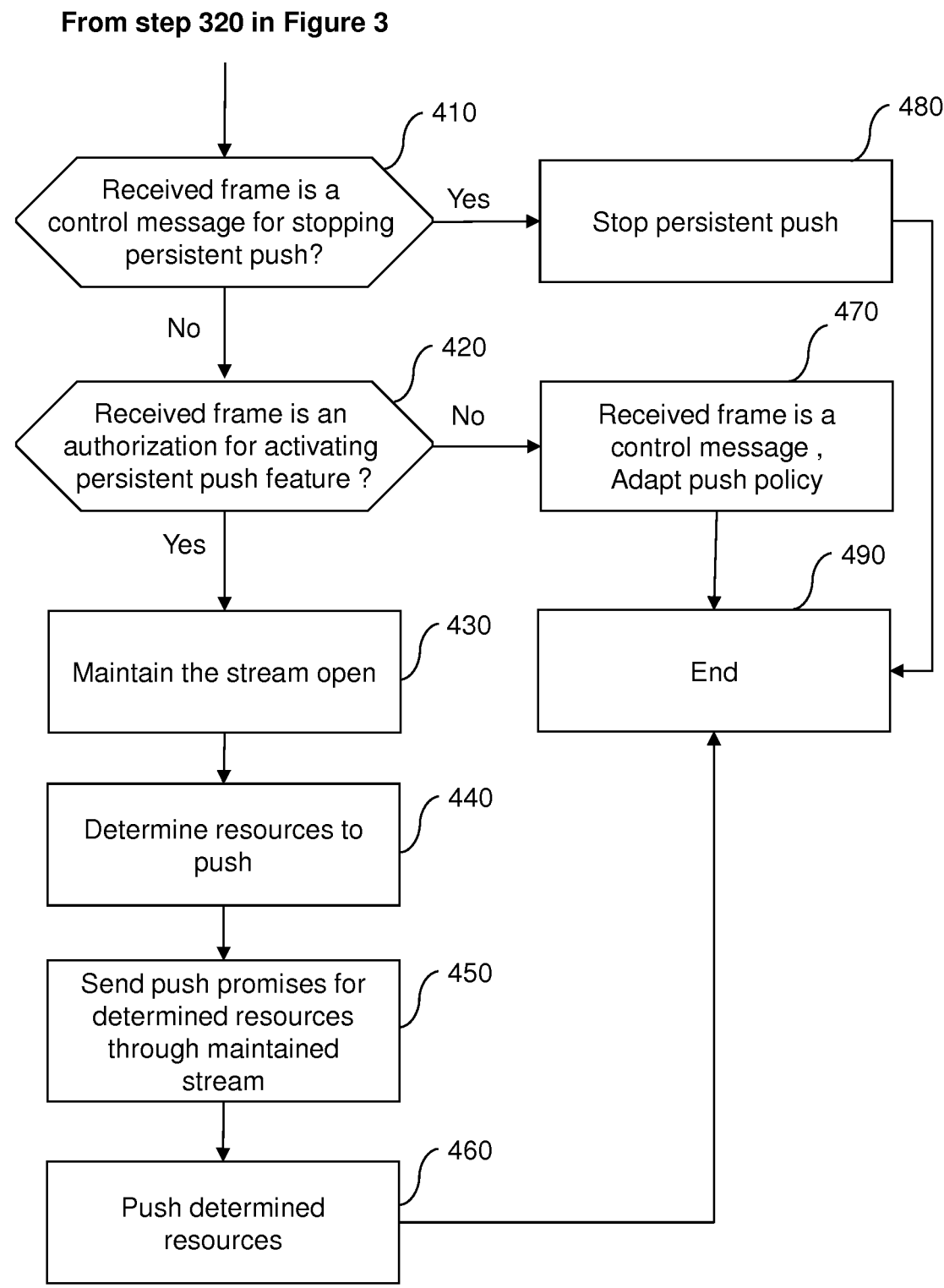
FIGS. 4a and 4b, illustrates examples of flowcharts illustrating further steps of the method of FIG. 3.
Figure 4B:
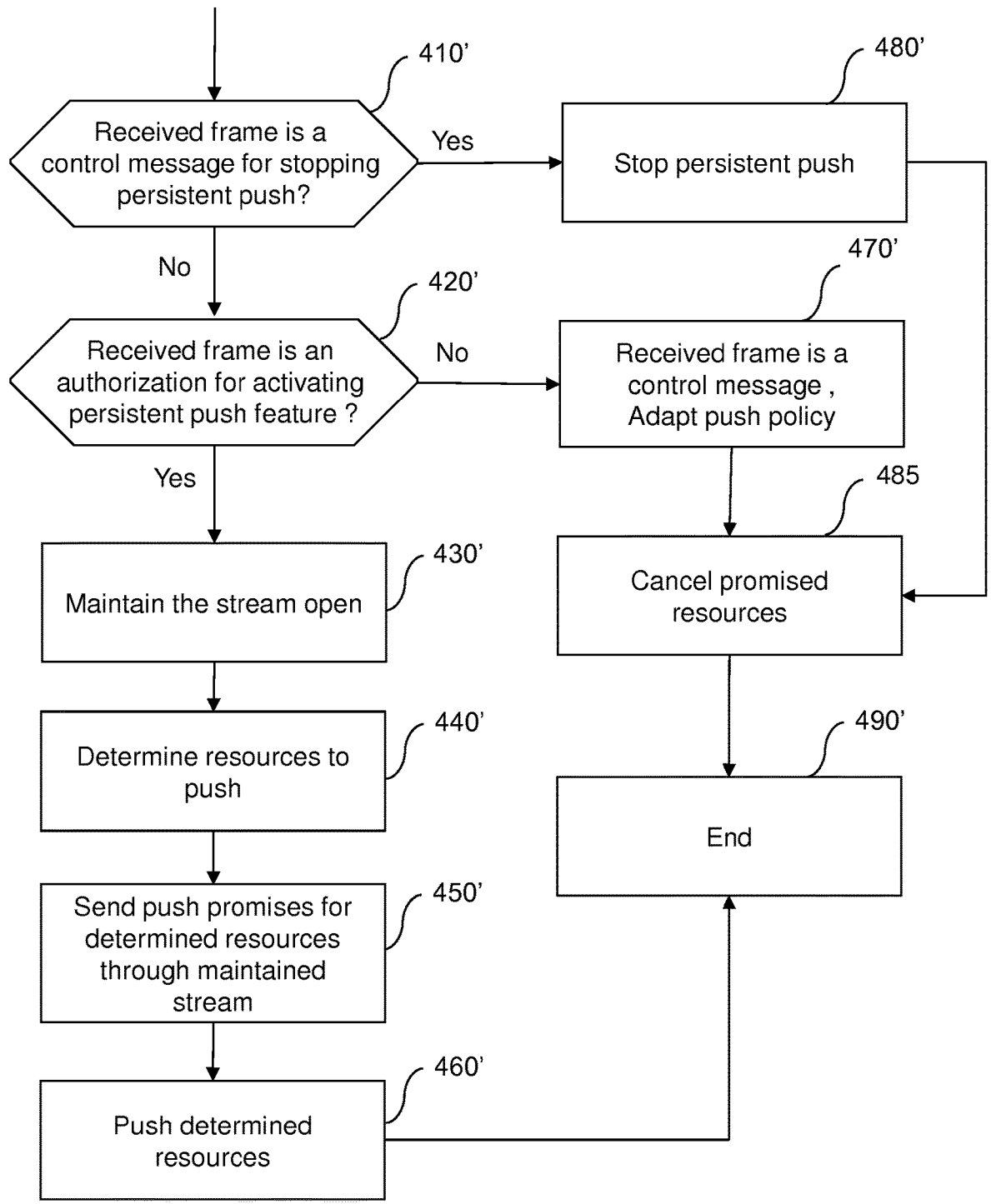

If it is determined at step 310 that the frame comprises persistent push related data, the frame is handled at step 320 and the following steps are detailed hereafter with reference to FIG. 4a or to FIG. 4b.

On the contrary, if no persistent push related data are found in the received frame, the server 16 chooses at step 330 whether persistent push should be advertised to client 10 or not, i.e. if the server 16 sends an indication to the client 10 for indicating that it supports persistent push and that client may request or allow it. This choice to advertise persistent push capabilities of the server 16 or not, depends on the advertisement policy of the server 16.

For instance, the server 16 may advertise persistent push each time a request is received from the client, or each time a new connection is established with the client 10 (i.e. in response to the first client request).

In a variant, persistent push may be advertised only when the client 10 requests a specific set of resources. In this case, the data used to advertise persistent push may be comprised directly inside said resources.

If it is determined to advertise persistent push to the client, the process goes to step 340, during which the server 16 prepares a response to the frame received at step 300, including an indication for advertising the persistent push, for instance, by obtaining the required data if data are required in the frame from the client.

In practice, the indication provided by the server to advertise its persistent push capability comprises persistent push related data (e.g. specific URL, header value, flag) as described before with reference to step 310.

For instance, the server 16 may indicate the specific URL http://example.com/push/ as its URL specific for persistent push for a site whose address is http://example.com so that when the client 10 sends a request for the specific URL http://example.com/push/, it means that the client 10 allows the server 16 to perform persistent push. Also, as described with reference to the next figures, such URL may also be used to exchange messages between client and server regarding persistent push in general, for instance for stopping persistent push or modifying the push policy (e.g. kind, quality of pushed data).

The specific URL may also be composed of a URL-PATH that explicitly designate the resources for which persistent push is activated (e.g. http://example.com/push/<path_to_resources>). For instance, it could be the path leading to the manifest (MPD) in DASH.

The specific URL may be provided to the client 10 through different means. It may be embedded in a resource, for instance in a manifest file such as a DASH MPD as shown in FIGS. 6 and 7, or directly in a web page.

In some embodiments, the specific URL may be described through an HTTP header added by the server 16 (e.g. push-url: /push/) (http://example.com is here implicit), but it may also be a well-known URL, shared by all servers that implement it.

Also, the specific URL may be directly embedded in a client application made available by the server 16, for instance a web application to be executed in a web browser.

In some embodiments, a plurality of specific URLs may be defined, for instance when different kinds of resources may be pushed. By doing so, the server 16 may allow the client 10 to request persistent push only for a specific kind of resources (e.g. audio or video). The same results can be obtained by adding corresponding information in the frames used by a client to request persistent push (e.g. a single URL is defined, but client also adds an indication regarding resources it expects to be pushed).

According to another example, instead of relying on one or more specific URL(s), the server 16 may rely on a specific HTTP header to allow the client to request persistent push, as described before with reference to step 310.

The indication provided by the server 16 to advertise that it supports persistent push may be a "persistent-push-support" header filed with the value "true" or "yes" or "1" so that the client may understand that the server supports persistent push when processing the response.

One may note that the indication may be advertised during the establishment of the connection between the server 16 and the client 10, for instance during the process of negotiation of the communication protocol to be used on this connection.

The persistent push may be a feature of this protocol and thus, when choosing this specific protocol, the client knows how to proceed (e.g. adding a flag in the frame or a specific header) for activating this specific feature of the protocol.

On the contrary, if it is determined at step 330 to not advertise persistent push to the client, the process goes to step 350, during which the server 16 prepares a "mere" response to the frame received at step 300, for instance by obtaining the required data if data are required in the frame from the client 10.

Steps 340 and 350 are followed by step 360, during which the server 16 sends the response frame(s) to the client 10.

The process then ends at step 390. It should be noted that in some cases, there may be no response frame(s) to be returned in response to a received frame. More generally, response may be determined not based on a single received frame, but on a set of received frames. If there is no response to return, no response frame is sent at step 360. In the case where persistent push should be advertised (which is determined at step 330), an option for the server 16 may be to create one or more response frame(s) specifically for advertising persistent push.

FIG. 4a shows other steps of the method for providing data that may follow step 320 in FIG. 3 according to a particular embodiment. These steps are also implemented at the server 16.

In this example, three main kinds of persistent push related data are considered: authorization to activate the persistent push feature implemented in the server, a control message for stopping persistent push (i.e. the server is no longer allowed to perform persistent push) and control messages for adapting the persistent push policy (e.g. which resources are pushed by the server).

At step 410, it is determined, based on the persistent push related data comprised in the frame whether the received frame is a control message for stopping persistent push.

If it is not, it is then determined at step 420 whether the received frame is an authorization for activating persistent push feature.

If so, the client-initiated stream to be used for sending PUSH_PROMISE frames is maintained open at step 430. Generally speaking, this consists in ensuring that at any time, a client-initiated stream remains open, hence allowing server to send PUSH_PROMISE frames through it. Two exemplary means for keeping the stream open are provided below, only for illustrative purpose.

In practice, the frame is received at step 300 via a client-initiated stream, which is associated with an URL. This frame may include an URL thus initiating a stream directed to this URL. Otherwise, the frame may only comprise a stream identifier, which means that the stream is not new (i.e. it is already opened).

In a first example, the received frame comprises an URL corresponding to an indication provided by the server, typically when advertising that it supports persistent push (as described with reference to FIG. 3). The server 16 recognises this specific URL that it has provided, and thus, it can conclude that the frame received at step 300 is for allowing persistent push based on this URL. In this way, the associated client-initiated stream is kept continuously (or indefinitely) open (i.e. no date of end is defined) so that it may be used by the server 16 to send PUSH_PROMISE frames announcing which resources the server 16 intends to push.

In addition, it may be noted that this client-initiated stream may also be used to exchange persistent push related data for modifying the persistent push policy of the server 16 (such as the ones processed at step 470 as described below) both from client to server and from server to client. More details regarding this aspect are provided hereafter with reference to FIG. 5.

In a second example, the frame from the client is not directed to a specific URL defined by the server with regard to persistent push. In this case, the server can send a first set of PUSH_PROMISE frames prior to sending the response without delaying it significantly. Then, the server can send the response, but when it reaches the end of said response, instead of sending a frame comprising the END_STREAM flag (which indicates the end of the stream and is generally used at the end of a HTTP response sent through HTTP/2), the server could send a frame comprising a END_SEGMENT flag as described in the IETF draft "draft-ietf-httpbis-http2-13". Consequently, the corresponding stream is not closed, and the server can still use it to send PUSH_PROMISE frames.

A client according to the present invention is thus configured to handle END_SEGMENT flags so that the stream is kept available for receiving PUSH_PROMISE frames from the server 16 once persistent push is required without relying on a specific URL defined by the server 16.

Once a stream is maintained open for sending PUSH_PROMISE frames at step 430, resources to be pushed are determined at step 440.

Since persistent push is allowed by the client 10, the set of resources to be pushed may not be the latest set of resources that is pushed on this stream or another one. It should be noted that the stream which is kept open and used for such «later on» PUSH_PROMISE frames is not necessarily the same as the one used initially to allow persistent push. This is for instance described hereafter with reference to FIG. 5b. For instance, the "kept open" stream may have to be closed after the server has sent a message. Next, the client may send another request and the corresponding stream may then be kept open. Alternatively, the case of a server keeping multiple streams open is also considered.

Indeed, later on, as long as persistent push remains activated (as long as the corresponding stream is maintained open for sending PUSH_PROMISE frames), the server may perform this step again and push other resources. For instance, in the case of live broadcasting of an event using video, the server 16 may be configured to push video segments as soon as a new video segment is available. By doing so, the latency between data availability and its delivery to clients may be minimized. In another example, the server may determine other resources to push after the push policy has changed (e.g. regarding quality requirements or subtitles). Alternatively, the server may periodically check if there are new resources to be pushed.

In some cases, the resources to be pushed may be determined based on the information on the push policy received from the client. For instance, when receiving the authorisation from the client, a client may also indicate which kinds of resources it expects to be pushed, for instance in the header "Accept" of the request. Alternatively, the kinds of expected resources may be described in the request body. In the case of DASH, a client may for instance indicate a position in time or an adaptation set or representation so that the pushed video data starts at corresponding time or corresponds to said adaptation set or representation.

Step 440 is followed by step 450, where PUSH_PROMISE frames are sent to client through the client-initiated stream maintained open. Finally, the resources to push are pushed to client later on at step 460 by opening new server-initiated streams. Steps 440, 450 and 460 are repeated by the server until it receives a new frame from the client or until there is no more data to push.

The process then ends at step 490.

Back to step 410, if it is determined that the received frame is a control message for stopping persistent push, i.e. if the server is no longer allowed to push data at any time using the client-initiated stream for PUSH_PROMISE frames, persistent push is stopped at step 480. In practice, stopping the persistent push is done by ending the process started at step 430 (i.e. maintaining a client-initiated stream open) in response to the authorization to activate persistent push. Step 480 is followed by the end of the process (step 490).

Back to step 420, if it is determined that the received frame is not an authorization for activating persistent push, the server 16 concludes that the frame is a control message for adapting the persistent push policy. This control message is processed at step 470.

In DASH, the client may perform streaming control of media contents over HTTP, for instance by requiring a greater/lower quality for video segments, or subtitles in a given language. Also, the client may notify the server about user-selected adaptation sets to be pushed. If the client detects modification in available bandwidth, it may request to the server (using a control message) to switch representations to be pushed in order to adapt the content (and so the persistent push policy) to the new available bandwidth.

The client may also send control messages regarding events associated with user and that may impact the server push policy: for instance, when the media presentation is paused or when the user application buffer is full. In this way, notifying this event to the server allows avoiding overfilling its HTTP cache with media data while the application is currently paused. All other commands (play, stop or trick mode like fast forward or fast rewind) or position in time (e.g. if user paused video, a part may be buffered, and the client may skip some parts) can also be exchanged with the server so the server can adapt its push policy (i.e. the list of media segments to be pushed).

The client can also communicate about the client's cache content to avoid that the server pushes data that is already present in client's cache. In this way, the client wouldn't have to reset unnecessary PUSH_PROMISE frames. This feature is very important in the case where the video is rewound and watched again, since the segments in cache are already available and thus there is no need to push them again.

Step 470 is followed by the end of the process (step 490).

It is to be noted that when the client performs streaming control of media content, for instance by sending control messages over the persistent push stream (as described herein below by reference to FIG. 5a or to FIG. 5c), the new request to the server reaches the latter within a time period corresponding to a one-way network time period. During this time period, the server may send several PUSH_PROMISE frames to the client leading to transmission of unneeded resources or data.

FIG. 4b shows other steps of the method described by reference to FIG. 3 for providing data that may follow step 320, according to a particular embodiment addressing this problem. These steps are implemented in server 16.

Steps 410' to 480' and step 490' are similar to steps 410 to 480 and to step 490 described by reference to FIG. 4a, respectively.

According to particular embodiments of the invention such as the one illustrated in FIG. 4b, promised resources may be cancelled under particular circumstances to avoid pushing resources that are no longer needed by the client and wasting network bandwidth with unnecessary data.

As illustrated in FIG. 4b, all on-going promised resources that have not been already fully sent are discarded or cancelled by the server if it is determined by the server, at step 410', that the persistent push process must be stopped or if it is determined by the server, at step 420', that the push policy must be changed.

This is done during step 485 which is carried out after steps 470 or 480. For the sake of illustration, discarding the promised resources can be done by sending a RST_STREAM frame on the streams corresponding to these promised resources, that is to say by sending an abnormal termination item of information.

In a variant, the server may only cancel PUSH_PROMISE frames for which it has not already started to send promised resources.

In addition to the cancellation of PUSH_PROMISE frames, the server may reconsider its push policy and the list of next segments to be pushed.

In an alternative embodiment, if the client does not use any specific control messages to stop persistent push but relies on closing the stream associated with the persistent push URL, the server cancels all on-going promised resources that have not been already fully sent, at step 485, when it receives a RST_STREAM frame for the persistent stream (step 410').

In an alternative embodiment, only a part of the on-going promised resources may be discarded by the server when it is notified that persistent push must be stopped or that the push policy must be changed. For the sake of illustration and by considering video streaming, the resources for the oldest PUSH_PROMISE that are not yet completed may still be sent by the server if a segment boundary does not coincide with a valid stream access point (for example, the end of a video sequence or the end of a chapter). Therefore, according to that example, only promised data after a valid stream access point would be discarded.

As illustrated, the process ends at step 490' after step 485 has been carried out.

Figure 5A:
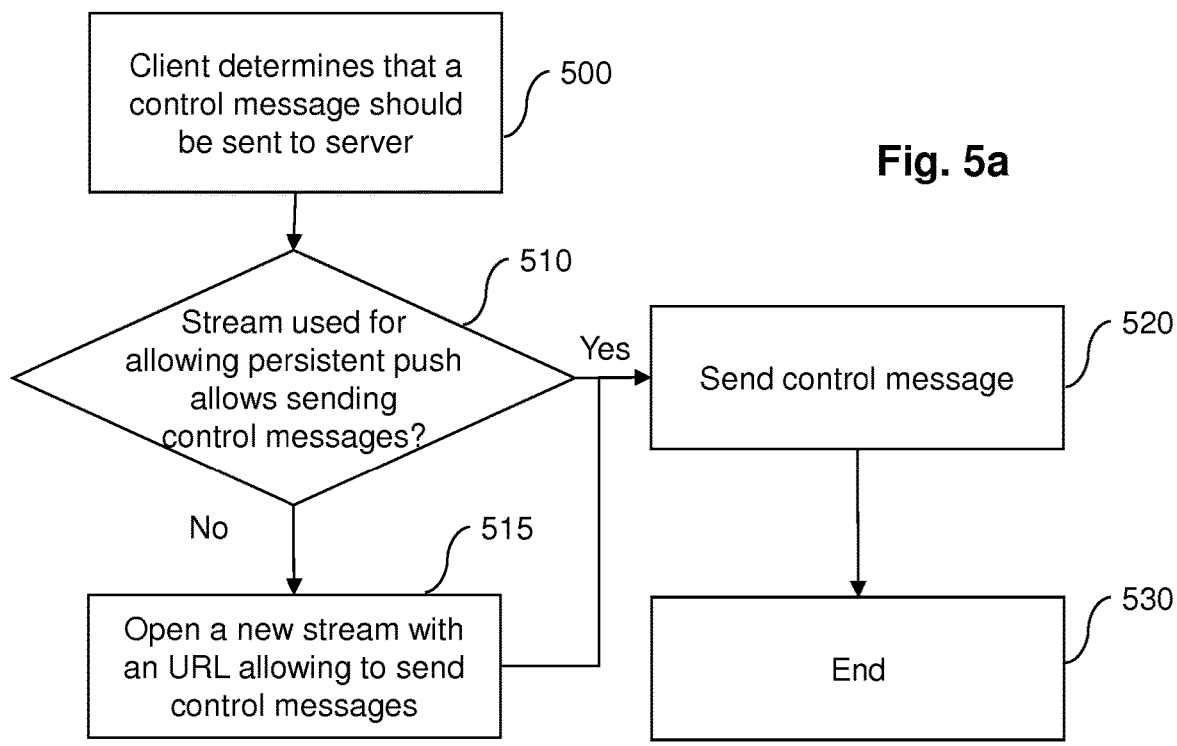
FIGS. 5a, 5b, 5c, and 5d, illustrates examples of flowcharts illustrating exemplary exchanges of control messages between a server and a client, according to embodiments.
Figure 5B:
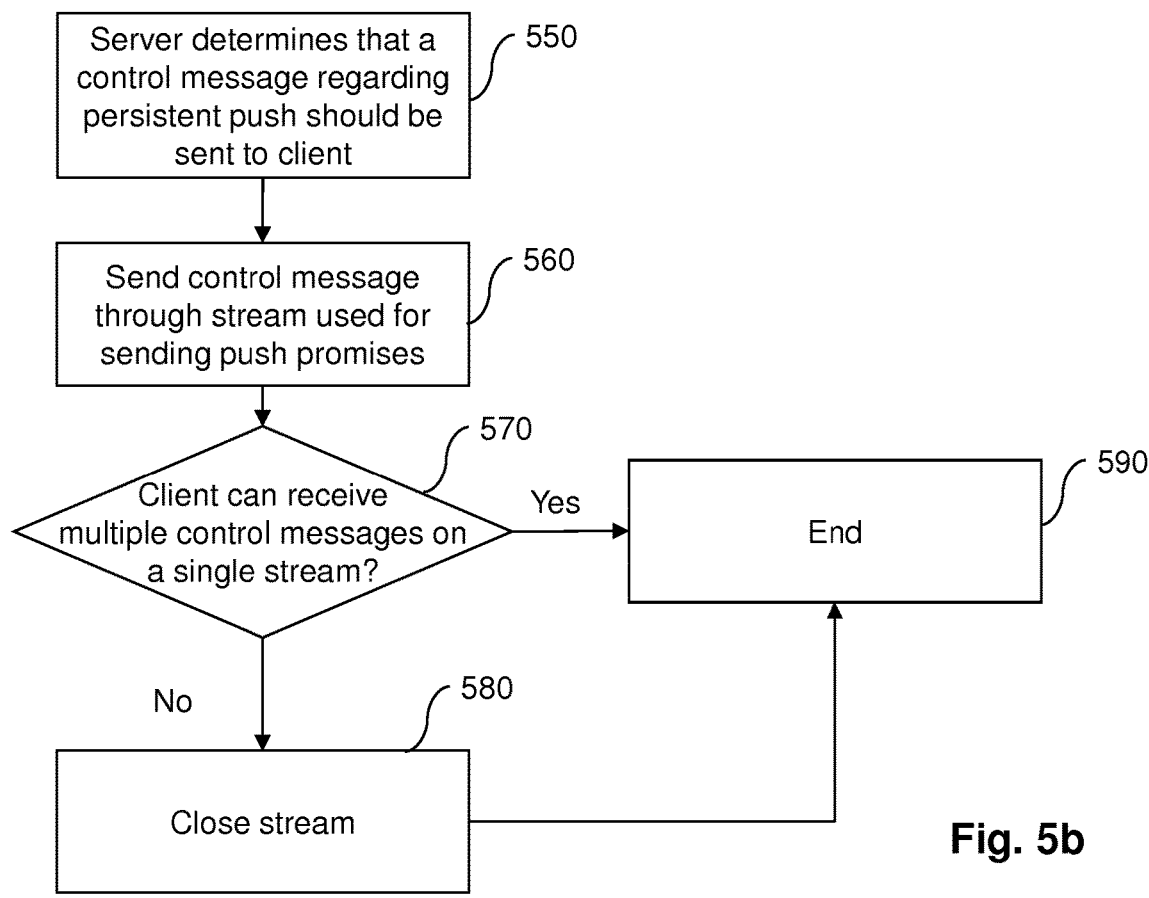

FIGS. 5a and 5b show steps performed respectively by the client 10 and by the server 16 for exchanging control messages about the persistent push according to a particular embodiment.

Figure 5C:
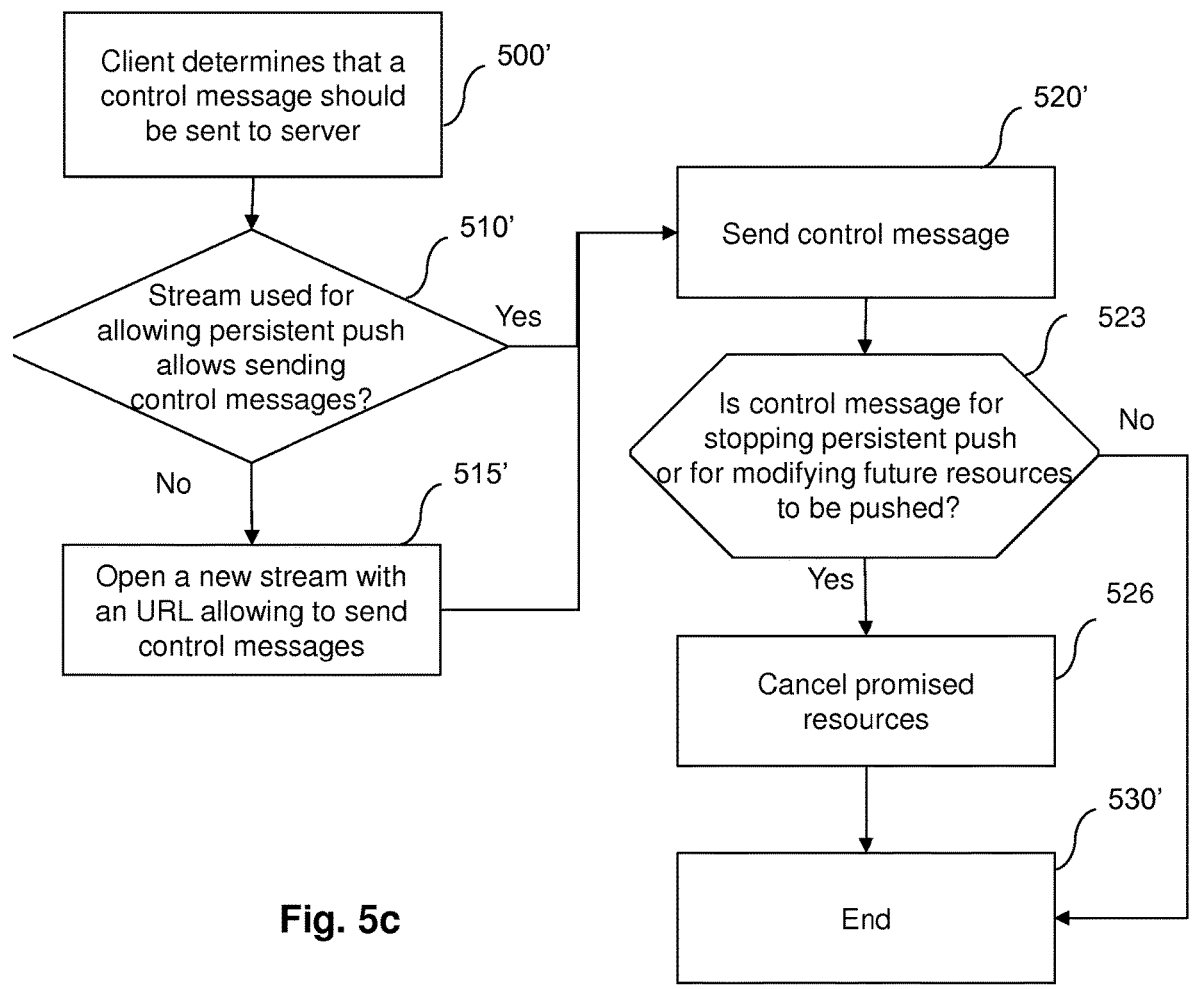
Figure 5D:
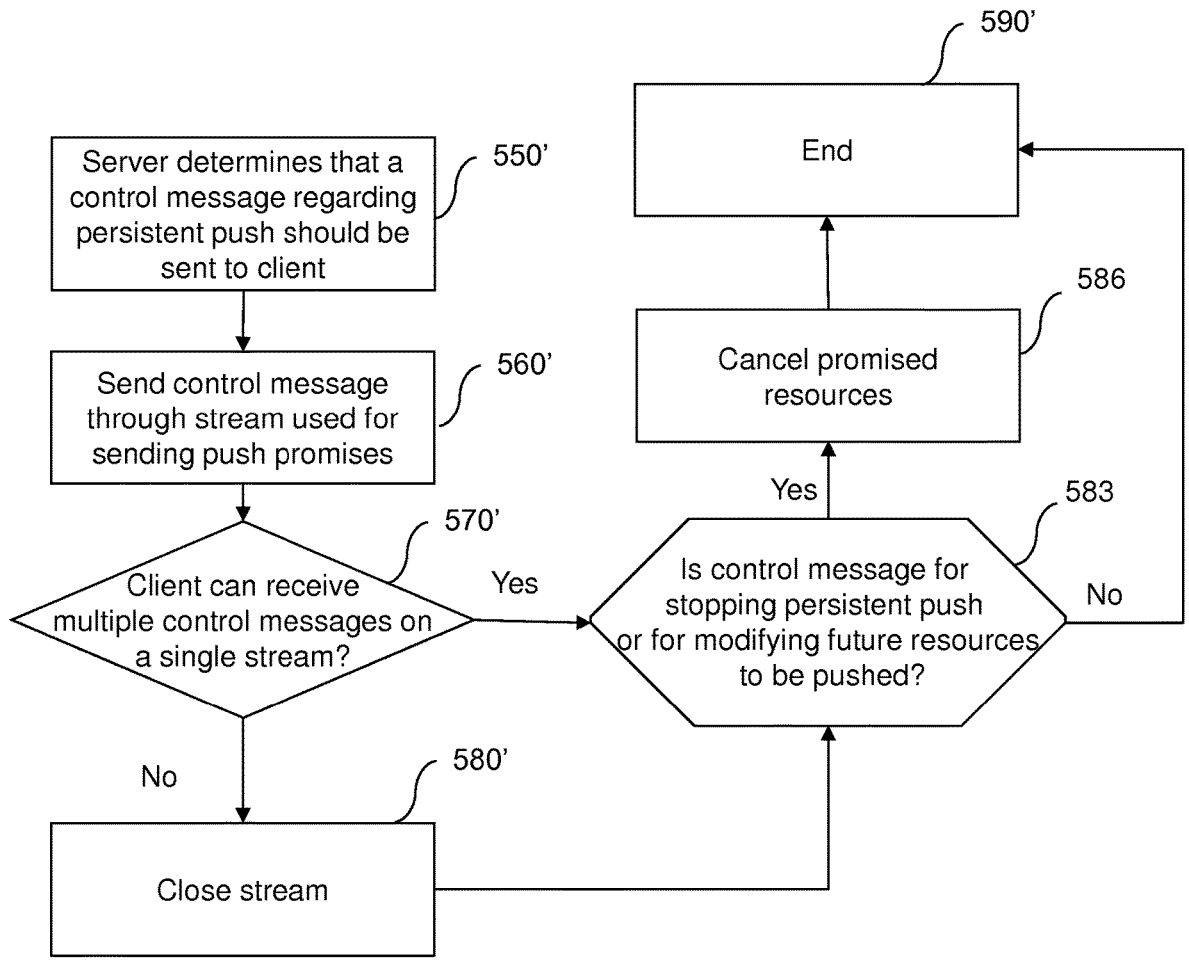

FIGS. 5c and 5d shows steps performed respectively by the client 10 and by the server 16 for exchanging control messages about the persistent push according to other embodiments. More precisely, the steps of FIG. 5c illustrate an alternative embodiment of the steps illustrated in FIG. 5a, making it possible to avoid transmission of unneeded resources or data. Similarly, the steps of FIG. 5d illustrate an alternative embodiment of the steps illustrated in FIG. 5b, making it possible to avoid transmission of unneeded resources or data.

It is to be noted that the embodiments described by reference to FIGS. 5a to 5d are different embodiments which may coexist or not. For example, the embodiments described by reference to FIG. 5a and to FIG. 5b may coexist or may be implemented independently (i.e. the control messages of FIGS. 5a and 5b are not the same).

As described with reference to step 470 in FIG. 4a and with reference 470' in FIG. 4b, such control messages may be sent for instance to indicate a specific event on the client side (e.g. that video has been paused) that may require to adapt the persistent push policy. In a variant, the message may indicate that a different kind of resources is required (e.g. higher resolution video data). A request for allowing/starting persistent push (as described before with reference to FIGS. 4a and 4b) is also a kind of control message. In this example, it is assumed that the persistent push is currently allowed for the server 16 (i.e. the client has already sent its authorization to perform persistent push).

According to the particular embodiment described by reference to FIG. 5a, the process starts at step 500, during which the client 10 determines that a control message should be sent to the server.

At step 510, the client checked whether the stream that it has previously used for allowing persistent push can be used for sending such a control message.

For instance, if a specific URL is defined by the server to enable persistent push as previously described, the client does not expect a specific response to be provided for the corresponding request. Therefore, the corresponding stream can be kept open, and the client and the server can rely on this stream to exchange control message regarding persistent push. A particular such case is the one where the specific URL is a WebSocket URL (e.g. ws://example.org/push/).

Indeed, in this case, client may be able to establish a WebSocket connection with the server, said connection being a specific stream of the single HTTP/2 connection between the client and the server. Advantageously, since WebSocket is an already defined protocol and is widely implemented, there is no need to specify another protocol specific to the exchange of persistent push control message over a given HTTP/2 stream. Yet, defining such a protocol is a possible solution.

Thus, if the stream supports so, the control message is sent through said stream at step 520, and the process ends at step 530.

On the contrary, the stream maintained open may not be suitable to exchange control messages (for instance when the client has access to an HTTP/2 library through a more basic HTTP API), or the client may not want to send control messages through it. Thus, the client may use a URL (or a set of URLs) specifically defined by the server 16 for providing control messages.

At step 515, the client thus opens a new stream directed to the defined URL, and sends the control message to the server through this stream. In this case, the stream is open for the sole purpose of sending the control message. For instance, the control message may be sent to the server as the payload of a POST request, said control message being serialized as text, XML or JSON data. Alternatively, the control message can be sent as parameters in an URL query or via some additional HTTP headers. Alternatively, in the case where a plurality of URLs is defined by the server 16, each URL corresponds to a specific kind of control message (e.g. low quality, English subtitles, or pause event). In this case, there is no need to provide a payload. This solution is especially useful when no specific URL is defined to enable persistent push. Such an URL can be detected by the server when the control message is received, since it has been defined by it.

To do so, the server 16 uses means similar to the ones described with regard to FIG. 3 regarding the advertising of persistent push to the client by the server. Once a new stream has been opened, the control message is sent at step 520, and the process ends (step 530).

It should also be noted that relying on a WebSocket URL as the specific URL to enable persistent push also provides a solution suitable to the client when it has no access to HTTP/2 API (but only to HTTP/2 library with a more basic HTTP API), as may be the case of a web client executed by a web browser. Indeed, WebSocket connection is generally accessible to such clients, and the web browser can ensure that said WebSocket connection is obtained as a specific stream of the HTTP/2 connection with said server.

The particular embodiment described by reference to FIG. 5c aims at avoiding transmission of unneeded resources or data when persistent push is to be stopped or when the push policy is to be adapted.

Steps 500' to 520' and step 530' illustrated in FIG. 5c are similar to steps 500 to 520 and to step 530 described by reference to FIG. 5a.

Compares to the steps described by reference to FIG. 5a, FIG. 5c illustrates additional steps that can be carried out by the client when it exchanges control messages directed to the persistent push.

As described by reference to steps 515 and 520, the client may perform streaming control of media contents either by sending control messages through the persistent push stream or by closing the persistent push stream and opening a new persistent push stream.

As mentioned above, the new request is received by the server after a time delay typically corresponding to a one-way network delay. During this time period, the server may have already sent several PUSH_PROMISE frames to the client whose corresponding resources are not needed anymore.

Therefore, according to the embodiment illustrated in FIG. 5c, a step is carried out by the client to determine whether or not the new stream or the control message aims at stopping or changing the representation being streamed by the server (step 523).

If the new stream or the control message aims at stopping or changing the representation being streamed by the server, the client cancels all promised resources for which promised data has not already been received, during step 526, for example by sending a RST_STREAM frame for each corresponding stream. This avoids the server pushing those resources and wasting network bandwidth with unnecessary data. Next, the process ends at steps 530'.

On the contrary, if the new stream or the control message does not aim at stopping or changing the representation being streamed by the server, the process ends directly at step 530'.

In an alternative embodiment, the client can cancel only part of the promised resources. For the sake of illustration, it can look at the URL of each promised resource and determine from the MPD if the promised resource is still needed. According to another example, to determine if the promised resource is still needed, the client may refer to its buffer filling level to ensure that enough resources will be received to maintain a minimum filling level. If the resource is no longer needed, the associated stream is cancelled.

In another example directed to video streaming, the resource for the oldest PUSH_PROMISE frame not yet completed may still be authorized by the client if segment boundary does not coincide with a valid stream access point (for example, the end of a video sequence). In such a case, only promised data corresponding to data located after a valid stream access point would be discarded by the client.

Still in an alternative embodiment, the step of cancellation of the PUSH_PROMISE frames is performed either by the server or by the client. For instance, if the application implemented by the client (e.g. web application in a web browser) does not have an API to be notified of on-going PUSH_PROMISE frames and/or to send RST_STREAM frames, the step of cancellation of PUSH_PROMISE frames may be performed by the server only. On the contrary, if the client is able to cancel the PUSH_PROMISE frames, the step of cancellation of PUSH_PROMISE frames may be performed by the client only.

FIG. 5b describes the sending of a control message regarding persistent push by the server 16 to the client 10.

In DASH, a mechanism called "events" allows signalling aperiodic sparse media-time auxiliary information to the client. The events are either specific timed information included in an MPD or time information directly embedded into media segments using a specific file format Event Message box ('emsg').

The specific URL used to enable persistent push can provide a complementary way to send control messages from the server to the client, in a more reactive way than existing DASH Event mechanism.

Indeed, by using the URL used by the client to send control message to the server 16 (as described with reference to FIG. 5a), the server can send control messages at any time without waiting for the next MPD update or the beginning of the next media segment.

Such control message may indicate for instance the resources that the server intends to push (e.g. video segments, representation). In addition to the PUSH_PROMISE frames that give a short-term view of resources about to be pushed, the server may also provide indications about resources that will be pushed in a long-term view, before sending PUSH_PROMISE frames. Thus, the client may provide a feedback regarding this long-term view. The control message may also comprise timing information (push start/push end) that can help the client for estimating network conditions. The control message may also provide indications about a new available MPD, or a next MPD that may be pushed through persistent push if needed.

Back to the process of FIG. 5b, at step 550, the server 16 determines that a control message regarding persistent push should be sent to the client 10.

At step 560, this control message is sent through the stream currently used for sending push promises.

Next, at step 570 the server 16 checks whether the client 10 can receive multiple indications on a single stream. Indeed, depending on the considered client, this may not always be the case. As previously described, in some cases, a single stream can be used by client and server to exchange control messages. This may for instance be the case when a specific URL is defined by the server and used by the client for allowing persistent push. Alternatively, another stream, also initiated by the client, may be kept open by server so that PUSH_PROMISE frames but also other control messages can be sent to the client. In this case, the server may for instance include an END_SEGMENT flag as described in IETF draft "draft-ietf-httpbis-http2-13" in order to keep the stream open.

However, in some other cases, a client may receive only a single indication through each stream. For instance, this may be the case of a client application running in a web browser, said web browser using an HTTP/2 library but providing only an HTTP/1.x API to the web application that interact with it (as described before). As previously noted, a solution to this issue may consist in relying on a WebSocket URL to enable persistent push. Indeed, WebSocket is accessible to a client application running in a web browser and a WebSocket stream can be embedded as a dedicated stream in an HTTP/2 connection. The present invention is thus also compatible with client applications that access HTTP/2 library through an HTTP/1.X API.

If the client can receive multiple control messages on a single stream, the process ends at step 590.

On the other hand, if the client cannot receive multiple control messages on a single stream, the stream is closed at step 580. In this case, and if no other client-initiated stream can be kept open (a server may keep open multiple client-initiated streams in order to cope more easily with the sending of control messages or the unexpected closing of streams by client), it is assumed that the client will quickly send another request to the server so that it can be used to send PUSH_PROMISE frames (and possibly later on control messages). Such request may for instance be a request directed to a specific URL used to enable persistent push.

Similarly to the embodiment described by reference to FIG. 5c, the particular embodiment described by reference to FIG. 5d aims at avoiding transmission of unneeded resources or data when persistent push is to be stopped or when the push policy is to be adapted.

Steps 550' to 580' and step 590' illustrated in FIG. 5d are similar to steps 550 to 580 and to step 590 described by reference to FIG. 5b.

According to the embodiment illustrated in FIG. 5d, a step is carried out by the server to determine whether or not the control message aims at stopping the persistent push or at modifying the list of future resources to be pushed (step 583).

If the control message aims at stopping the persistent push or at modifying the list of future resources to be pushed, the server cancels all promised resources for which promised data has not already been sent, during step 826, for example by sending a RST_STREAM frame for each corresponding stream. This avoids the server pushing these resources and wastes network bandwidth with unneeded resources or data. Next, the process ends at steps 590'.

On the contrary, if the control message does not aim at stopping the persistent push or at modifying the list of future resources to be pushed, the process ends directly at step 590'.

In an alternative embodiment, the server can cancel only part of the promised resources as described by reference to FIG. 4b.

FIGS. 6 and 7 represent two exemplary resources that may be sent by the server to advertise persistent push, i.e. to indicate that it supports persistent push and that client may request it.

As described above, in some embodiments, the server includes an indication in a resource requested by the client, in order to advertise persistent push.

In the context of DASH, the server can use the manifest, describing the multimedia presentation (MPD) to be played by the client, to advertise the specific URLs allowing persistent push.

The indication, for instance called <PushURL> and specifying specific URLs is included in the MPD. This indication may be present at various levels:

At MPD level in MPD.PushURL element;
At Period level in Period.PushURL element;
At Adaptation Set level in AdaptationSet.PushURL element; or
At Representation level in Representation.PushURL element.

The indication (push URLs) defined at a specific level would then apply to all representations pertaining to this level.

For instance, in FIG. 6, the push URL 610 is defined at MPD level. If the client allows the server to use persistent push using this URL (as described with reference to FIG. 4), the server would be authorized to push segments from any of the representations defined in this MPD.

In this example, the specified URL comprises an identifier after its "/push/" part: by doing so, server may be able to determine which MPD (hence which video) the client is using. However, in another implementation, the URL may simply be "http://cdn2.example.com/push/": in this case, the client would have to provide further indications to the server regarding the requested video. This could for instance be achieved by using an HTTP POST request to said specific URL and by including in the body of the request an identifier of the MPD (or of the video).

In another example, in FIG. 7, two different push URLs are defined: one for the adaptation set corresponding to the video 730 and another one for the adaptation set corresponding to the audio 740. In such case, the client can activate and control the persistent push feature separately for audio and video.

In the MPD, a BaseURL element is used to specify one or more common locations for Segments and other resources. If the persistent push URLs are specified as relative URLs, then they are resolved according to RFC3986 at each level of the MPD with respect to the BaseURL element specified at the level above (the document "base URI" as defined in RFC 3986 Section 5.1 is considered to be the level above the MPD level). For instance, in FIG. 7, there exist two alternative URLs (defined via the PushURL element 710) that could be used by the client to allow persistent push for the first adaptation set:

http://cdn1.example.com/push/2564597502, or
http://cdn2.example.com/push/2564597502.

As described in FIGS. 5a and 5b, the push URL can be used to open a bidirectional communication channel between the client and the server.

Thus, as described before, in preferred embodiments, a specific URL is defined by the server, and the corresponding stream is kept open and used for exchanging control messages.

In particular, the specific URL may be a WebSocket URL. The WebSocket is advantageously an already defined protocol that can be embedded as an HTTP/2 stream in an HTTP/2 connection, and it is accessible to web apps running in web browser.

Alternatively, the specific URL is not a WebSocket URL but a HTTP URL, so that the client may send a new request to said specific URL each time a control message has to be sent, or in variant another specific URL (i.e. other than the one used to authorize persistent push) may be used by the client to send other control messages.

In alternative embodiments, as described above, no specific URL is defined by the server. Specific data may be thus added by the client to a "normal" request in order to enable persistent push. For instance, the specific data may be inserted in a HTTP header or a protocol parameter.

In this case, a response to the request is generally expected by the client and consequently, the server sends a response and the stream is kept open after the sending of that response, by means similar to the END_SEGMENT flag described in the IETF draft "draft-ietf-httpbis-http2-13".

Control messages may be sent by the client, for instance using another stream. A specific URL or a set of specific URLs may be defined for each kind of control messages.

In some embodiments, the intermediary (between the server and the client) is configured to modify some control messages exchanged between the client and the server. For instance, if the client that has allowed persistent push to a server decides to switch to a low resolution which is already fully available at a given intermediary, said intermediary may replace the indication "switch to low resolution" by an indication such as "temporarily stop persistent push". Indeed, there is no need for server to push low resolution resources to said intermediary given that these resources are already available in the cache of the intermediary.

Similarly, the intermediary may also be configured to modify the set of resources pushed by a server. For instance, if there is enough bandwidth available between the intermediary and the server, pushing high resolution video data may be fast enough, but pushing the same resources between intermediary and client may be too slow as bandwidth between client and intermediary is likely to be smaller. In such a case, intermediary may decide to push a lower resolution than the one selected by server for client. Of course, this is possible only if said lower resolution is available to the intermediary. Consequently, due to the constrained bandwidth between a client and an intermediary, said intermediary may provide indications to server so that said server provides it with a lower resolution than the maximal resolution that could be obtained based on available bandwidth between said intermediary and said server.

Finally, a given intermediary may be connected to several clients that play videos from the same server. In this case, said intermediary may have a single connection with said server for all corresponding clients. Intermediary should then preserve a mapping of its incoming streams (from clients) with its outgoing streams (to server).

One may note that the client may know how to allow persistent push prior to establishing a connection with the server. This is typically the case when the client just want to replay a video for which it already knows the MPD (in cache memory), or when the server defines a single common URL that can be used for any video it hosts.

Therefore, in such a situation, a client may be able to rely on persistent push from the very beginning of the connection. By doing so, persistent push may be enabled right after the first request from the client, allowing the video data to be obtained and played especially quickly by the client.

This invention is applicable to HTTP/2 as well as any of similar protocols, such as the different versions of the SPDY (http://en.wikipedia.org/wiki/SPDY) protocol.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for providing resources to a client, the method being implemented at a server and comprising:
   making available an indication to the client, indicating that the server is configured to activate a predetermined push feature upon authorization of the client, the predetermined push feature allowing the server to continuously push resources to the client, the push feature being compliant with HTTP/2 protocol; and
   receiving a first message from the client, the first message being based on the indication and authorizing the server to continuously push resources to the client; and
   sending a promise message to the client, the promise message enabling the client to be informed in advance of data the server intends to push,
   wherein the server determines whether to activate the predetermined push feature based on a specific set of resources included in the first message.

2. The method of claim 1, wherein the first message allowing the server to continuously push resources is received through a first client-initiated stream.

3. The method of claim 2, further comprising maintaining continuously open the first client-initiated stream or a second client-initiated stream, for sending at least one second message for initiating the push of resources to the client, through the first client-initiated stream maintained open or the second client-initiated stream maintained open.

4. The method of claim 3, further comprising pushing the resources through at least one server-initiated stream.

5. The method of claim 1, further comprising a step of canceling at least a set of promised resources upon identification of a predetermined push modification event, the promised resources being resources that are to be pushed as a function of receiving the indication.

6. The method of claim 5, wherein the step of canceling at least a set of promised resources comprises the step of sending a message comprising an abnormal termination item of information on at least one stream corresponding to at least one promised resource.

7. The method of claim 1, further comprising receiving a first control message from the client, for adapting a predetermined push policy to be applied by the server when pushing resources.

8. The method of claim 7, wherein the first message allowing the server to continuously push resources and the first control message are received through a first client-initiated stream, the method further comprising sending a second control message to the client, through the first client-initiated stream or through the second client-initiated stream, and the second control message comprising one of the following elements: time information, kinds of resources about to be pushed, availability of new resources.

9. The method of claim 7, further comprising a step of canceling at least a set of promised resources upon identification of a predetermined push modification event, the promised resources being resources that are to be pushed as a function of receiving the indication, and wherein the first control message comprises an item of data representing the predetermined push modification event.

10. The method of claim 7, wherein the first message also comprises information about the predetermined push policy.

11. The method of claim 1, further comprising receiving a request from the client for a given resource, and in response, sending the requested resource in which the indication is included.

12. The method of claim 1, wherein the resources to push are media segments, wherein the first message is a control frame that does not identify a specific media segment to push.

13. The method of claim 1, wherein the push feature enables the server to continuously create new streams for pushing resources to the client, without receiving further requests from the client.

14. The method of claim 1, further comprising, upon receiving the first message, initiating a persistent connection between the server and the client, wherein the promise message is sent through the persistent connection.

15. A method for obtaining resources from a server, the method being implemented at a client and comprising:
   generating a first message based on an indication that the server is configured to activate a predetermined push feature upon authorization of the client, the predetermined push feature allowing the server to continuously push resources to the client, the push feature being compliant with HTTP/2 protocol; and
   sending the first message to the server, thereby allowing the server to continuously push resources to the client; and
   receiving a promise message from the server, the promise message enabling the client to be informed in advance of data the server intends to push,
   wherein the server determines whether to activate the predetermined push feature based on a specific set of resources included in the first message.

16. The method of claim 15, wherein the first message allowing the server to continuously push resources is sent through a first client-initiated stream.

17. The method of claim 16, further comprising receiving at least one second message for initiating the push of resources to the client, through the first client-initiated stream maintained continuously open by the server or a second client-initiated stream maintained continuously open by the server.

18. The method of claim 17, further comprising receiving the pushed resources through at least one server-initiated stream.

19. The method of claim 15, further comprising generating and sending at least one first control message to the server, for adapting a predetermined push policy to be applied by the server when pushing resources.

20. The method of claim 19, wherein the first control message is sent through the first client-initiated stream, the method further comprising receiving a second control message from the server, through the first client-initiated stream or through the second client-initiated stream, and the second control message comprising one of the following elements: time information, kinds of resources about to be pushed, availability of new resources.

21. The method of claim 19, further comprising the step of canceling at least a set of promised resources as a function of the at least one first control message to be sent to the server, the promised resources being resources for which promised data has not already been received.

22. The method of claim 19, wherein the first message also comprises information about the predetermined push policy.

23. The method of claim 15, further comprising sending a request for a given resource to the server, and in response, receiving the requested resource in which the indication is included.

* * * * *